US011643732B2

(12) United States Patent
Inoue et al.

(10) Patent No.: US 11,643,732 B2
(45) Date of Patent: May 9, 2023

(54) CORROSION-RESISTANT TRIVALENT-CHROMIUM CHEMICAL CONVERSION COATING AND SOLUTION FOR TRIVALENT-CHROMIUM CHEMICAL TREATMENT

(71) Applicant: DIPSOL CHEMICALS CO., LTD, Tokyo (JP)

(72) Inventors: Manabu Inoue, Tokyo (JP); Kimitaka Watanabe, Tokyo (JP); Go Nagata, Tokyo (JP); Motoi Nakatani, Tokyo (JP); Keita Ishizu, Tokyo (JP); Toshiki Inomata, Tokyo (JP)

(73) Assignee: Dipsol Chemicals Co., Ltd., Tokyo (JP)

( * ) Notice: Subject to any disclaimer, the term of this patent is extended or adjusted under 35 U.S.C. 154(b) by 329 days.

(21) Appl. No.: 15/497,776

(22) Filed: Apr. 26, 2017

(65) Prior Publication Data
US 2017/0226644 A1 Aug. 10, 2017

Related U.S. Application Data

(60) Continuation of application No. 14/154,677, filed on Jan. 14, 2014, now abandoned, which is a division of application No. 12/671,786, filed as application No. PCT/JP2008/063963 on Aug. 4, 2008, now abandoned.

(30) Foreign Application Priority Data

Aug. 3, 2007 (JP) .............................. JP2007-203284
Nov. 16, 2007 (JP) .............................. JP2007-298411

(51) Int. Cl.
C23C 22/30 (2006.01)
C23C 22/77 (2006.01)
C23C 22/53 (2006.01)
C23C 22/83 (2006.01)
C23C 22/46 (2006.01)
C23C 22/40 (2006.01)
C23C 22/47 (2006.01)
C23C 28/00 (2006.01)
C09D 5/08 (2006.01)
C23C 22/27 (2006.01)
C23C 22/33 (2006.01)

(52) U.S. Cl.
CPC .............. *C23C 22/77* (2013.01); *C09D 5/08* (2013.01); *C23C 22/27* (2013.01); *C23C 22/30* (2013.01); *C23C 22/33* (2013.01); *C23C 22/40* (2013.01); *C23C 22/46* (2013.01); *C23C 22/47* (2013.01); *C23C 22/53* (2013.01); *C23C 22/83* (2013.01); *C23C 28/3225* (2013.01); *C23C 28/34* (2013.01); *C23C 2222/10* (2013.01); *Y10T 428/273* (2015.01)

(58) Field of Classification Search
CPC ........................... C23C 2222/10; C23C 22/30
See application file for complete search history.

(56) References Cited

U.S. PATENT DOCUMENTS

| 6,287,704 | B1 | 9/2001 | Preikschat et al. | |
|---|---|---|---|---|
| 6,447,620 | B1* | 9/2002 | Komiyama | ............ C09D 5/084 |
| | | | | 148/264 |
| 6,946,201 | B2 | 9/2005 | Preikschat et al. | |
| 7,314,671 | B1 | 1/2008 | Preikschat et al. | |
| 2003/0145909 | A1 | 8/2003 | Diaddario, Jr. et al. | |
| 2004/0173289 | A1 | 9/2004 | Kinoshita et al. | |
| 2005/0109426 | A1* | 5/2005 | Inoue | ...................... C23C 22/47 |
| | | | | 148/258 |
| 2006/0266438 | A1 | 11/2006 | Diaddario, Jr. et al. | |
| 2007/0023104 | A1 | 2/2007 | Yamamoto et al. | |
| 2009/0020185 | A1* | 1/2009 | Inoue | ...................... C23C 22/30 |
| | | | | 148/400 |
| 2009/0266450 | A1* | 10/2009 | McCormick | ............ C23C 22/36 |
| | | | | 148/255 |

FOREIGN PATENT DOCUMENTS

| CN | 1729311 | A | 2/2006 |
|---|---|---|---|
| EP | 1318214 | A1 | 11/2003 |
| EP | 1693485 | A1 | 8/2006 |

(Continued)

OTHER PUBLICATIONS

Official Action issued to corresponding Japanese Patent Application JP 2009-526450 dated Nov. 25, 2013.
"Hexavalent Chromium Elution Test of Trivalent Chromium Chemical Conversion Coating," Aisannken News Augmented Edition, No. 23, Japan, Aug. 9, 2006.
English translation of JPH10-081976.
Chinese Office Action dated May 19, 2014, for CN Patent Application No. 201210217695.X.
Chen Xiaoping et al., "Effects of different Cr (III) complexes on performance of trivalent chromium passivation solution", vol. 41, No. 5, May 2008, pp. 33-35.
Japanese Office Action for JP Patent Application No. 2014-209643, dated Aug. 17, 2015.

(Continued)

Primary Examiner — Lois L Zheng
(74) Attorney, Agent, or Firm — Hoffmann & Baron, LLP

(57) ABSTRACT

A trivalent-chromium chemical conversion coating from which substantially no hexavalent chromium is released. The trivalent-chromium chemical conversion coating is one formed on the surface of a zinc or zinc-alloy deposit. In a brine spray test, the chemical conversion coating has unsusceptibility to corrosion (time required for white-rust formation) of 96 hours or longer. The chemical conversion coating has a hexavalent-chromium concentration less than 0.01 µg/cm² in terms of metal atom amount. The amount of hexavalent chromium released after 30-day standing in a thermo-hygrostatic chamber at a temperature of 80° C. and a humidity of 95% (amount of hexavalent chromium released when the coating is immersed in 100° C. water for 10 minutes) is smaller than 0.05 µg/cm².

13 Claims, No Drawings

(56) References Cited

FOREIGN PATENT DOCUMENTS

| | | |
|---|---|---|
| EP | 1734152 A1 | 12/2006 |
| EP | 1995348 A1 | 11/2008 |
| JP | H10-081976 A | 3/1998 |
| JP | 10176279 A | 6/1998 |
| JP | 2000199074 A | 7/2000 |
| JP | 2000509434 A | 7/2000 |
| JP | 2002226981 A | 8/2002 |
| JP | 2003147544 A | 5/2003 |
| JP | 2003166075 A | 6/2003 |
| JP | 2004002904 A | 1/2004 |
| JP | 2005085497 A | 3/2005 |
| JP | 2005187925 A | 7/2005 |
| JP | 2005194553 A | 7/2005 |
| JP | 2005206872 A | 8/2005 |
| JP | 2005240084 A | 9/2005 |
| JP | 2005248233 A | 9/2005 |
| JP | 20050240068 A | 9/2005 |
| JP | 2006274321 A | 2/2006 |
| JP | 2006274321 A | 10/2006 |
| JP | 2006317351 A | 11/2006 |
| JP | 20067342398 A | 12/2006 |
| WO | 2061174 A1 | 8/2002 |
| WO | 20060132426 A2 | 12/2006 |
| WO | 2009007208 A1 | 1/2009 |

OTHER PUBLICATIONS

Chinese Office Action and Search Report dated Apr. 1, 2013.
English Translation of the Written Opinion for PCT/JP2008/063963.
International Search Report dated Aug. 4, 2008.
Supplemental European Search Report and Opinion dated Mar. 7, 2011.
Extended European Search report dated Sep. 19, 2014.

\* cited by examiner

CORROSION-RESISTANT TRIVALENT-CHROMIUM CHEMICAL CONVERSION COATING AND SOLUTION FOR TRIVALENT-CHROMIUM CHEMICAL TREATMENT

This application is a Continuation of U.S. application Ser. No. 14/154,677, filed Jan. 14, 2014, currently pending, which in turn is a Divisional of U.S. application Ser. No. 12/671,786, filed Mar. 10, 2010, which is abandoned, which in turn is the National Stage Entry under 35 U.S.C. § 371 of International Patent Application No. PCT/JP2008/063963, filed Aug. 4, 2008, which in turn claims priority to Japanese Patent Application No. 2007-298411, filed Nov. 16, 2007, and also to Japanese Patent Application No. 2007-203284, filed Aug. 3, 2007, the contents of which are incorporated in their entirety by reference herein.

TECHNICAL FIELD

The present invention relates to a trivalent chromium corrosion resistant chemical conversion treatment coating film from which hexavalent chromium is not substantially eluted, the coating film being formed on zinc plating or zinc alloy plating, and a trivalent chromium chemical conversion treatment solution and a post-treatment solution after chemical conversion treatment used to form such a chemical conversion treatment coating film.

BACKGROUND ART

A method using zinc plating has been relatively widely employed as a method for inhibiting corrosion of the surface of a metal. However, the plating by itself does not provide a sufficient corrosion resistance, and thus a chromate treatment using hexavalent chromium after plating has been widely employed in industry. However, it has been pointed out in recent years that hexavalent chromium harms human bodies and the environment, and, as a result, the use of hexavalent chromium has been regulated.

In this connection, a trivalent chromium chemical conversion coating film using trivalent chromium has been developed as an alternative technology to a coating film formed with hexavalent chromium, and has started to be used. For example, Japanese Patent Application Publication No. 2000-509434 discloses a treatment method in which 5 to 100 g/L of trivalent chromium, nitrate, an organic acid and a salt of a metal such as cobalt are used. This method is to obtain a good corrosion resistance by carrying out the treatment at an elevated temperature in high concentration of chromium to form a thick trivalent chromium chemical conversion coating film. However, the method has disadvantage in wastewater treatment, because the concentration of chromium and the concentration of the organic acid in the treatment bath are high.

Patent Article 1: Japanese Patent Application Publication No. 2000-509434

DISCLOSURE OF THE INVENTION

In addition, it has been found out that there is a problem that, when such a conventional hexavalent chromium-free trivalent chromium chemical conversion treatment coating film is left for a long period in a natural environment, trivalent chromium in the coating film is oxidized, and harmful hexavalent chromium is detected in the coating film.

An object of the present invention is to provide a trivalent chromium corrosion resistant chemical conversion treatment coating film being formed on zinc or zinc-based alloy plating, and having a corrosion resistance equal to or more than a conventional coating film with a low chromium content. Moreover, in consideration of effect on human bodies and the environment, hexavalent chromium is not substantially detected in the coating film even after the coating film is left. In addition, another object of the present invention is to provide a trivalent chromium chemical conversion treatment solution and a post-treatment solution used after chemical conversion treatment, the treatment solution and the post-treatment solution being capable of forming such a chemical conversion treatment coating film.

The present inventors have made a thorough examination and found that a chemical conversion coating film that has a high corrosion resistance and from which hexavalent chromium is substantially not eluted even after the coating film is left can be obtained from a trivalent chromium chemical conversion coating film having low trivalent chromium concentration if the coating film itself is provided with a function of suppressing oxidation from trivalent chromium in the coating film to hexavalent chromium. In addition, the present inventors also found that such a chemical conversion coating film can be obtained by using a chemical conversion treatment liquid having a specific composition.

Accordingly, the present invention is a trivalent chromium chemical conversion coating film formed on a surface of zinc or zinc alloy plating characterized in that a corrosion resistance (a time required for the formation of white rust) in a salt spray test is 96 hours or more, a concentration of hexavalent chromium in terms of metal atoms in the chemical conversion coating film is less than 0.01 $\mu g/cm^2$, and an amount of hexavalent chromium eluted from the coating film left for 30 days in a constant temperature and humidity chamber at a temperature of 80° C. and at a humidity of 95% (an amount eluted by immersion of the coating film into hot water at a temperature of 100° C. for 10 minutes) is less than 0.05 $\mu g/cm^2$.

A preferred aspect of the present invention is the above-descried trivalent chromium chemical conversion coating film, in which a concentration of trivalent chromium in terms of metal atoms in the chemical conversion coating film is 2 to 20 $\mu g/cm^2$.

In addition, the trivalent chromium chemical conversion coating film, in which a cobalt concentration in the chemical conversion coating film is 0.2 to 3.5 $\mu g/cm^2$, is an aspect of the present invention. In this aspect, a preferable cobalt concentration is 0.3 to 3 $\mu g/cm^2$.

Furthermore, the trivalent chromium chemical conversion coating film, in which a cobalt concentration in the chemical conversion coating film is less than 0.2 $\mu g/cm^2$, is an aspect of the present invention. In this aspect, a preferable cobalt concentration is 0 to 0.17 $\mu g/cm^2$.

The reason why the chemical conversion coating film that have a high corrosion resistance and from which hexavalent chromium is substantially not eluted even after the coating film is left can be obtained by providing the coating film itself with a function of suppressing oxidation from trivalent chromium in the coating film to hexavalent chromium is not clear. However, through the investigation in the present invention, the present inventors assume that the reason is as follows. Specifically, it is assumed that detection of hexavalent chromium from a generally used trivalent chromium chemical conversion coating film which is being left is caused because $Co^{3+}$ in the chemical conversion coating film acts as an oxidizing agent to oxidize trivalent chromium.

Formation of a trivalent chromium chemical conversion coating film and an assumed generation mechanism of $Cr^{6+}$ by action of $Co^{3+}$ will be described below.

(i) Zinc is dissolved in an acidic treatment liquid, and electrons are released.

$$Zn \rightarrow Zn^{2+} + 2e^-$$

(ii) Hydrogen ions are consumed at the interface between the zinc and the treatment liquid, and the pH of the treatment liquid rises.

$$2H^+ + 2e^- \rightarrow H_2 \uparrow$$

(iii) Chromium hydroxide is generated by the rise of pH of the treatment liquid.

$$2Cr^{3+} + 6(OH^-) \rightarrow 2Cr(OH)_3 \downarrow$$

(iv) Also from $Co^{2+}$ that is used for improving the corrosion resistance in the treatment liquid, cobalt(II) hydroxide is generated in the vicinity of the interface with the zinc with the rise of pH. However, $Co^{2+}$ is converted to stable $Co^{3+}$ with time, because $Co^{2+}$ is unstable on the alkaline side.

$$Co(OH)_2 \rightarrow Co(OH)_3$$

(v) Other insoluble substances ($SiO_2$) and a small amount of the treatment liquid are also adsorbed and impregnated to be taken into the coating film, with gelation and deposition of chromium hydroxide and cobalt hydroxide ($Co^{2+}$, $Co^{3+}$)

(vi) The coating film is hardened in drying processes by deposition, dewatering of adsorbed substances and solidification. However, the coating film is not hardened when the drying is insufficient, and it is expected that chemical reactions will proceed in the coating film.

(vii) Since the chemical conversion coating film containing the treatment liquid is in a slightly acidic atmosphere, cobalt (III) hydroxide in the coating film is gradually liberated and dissolved, and $Co^{3+}$ is converted to $Co^{2+}$ that is stable in an acidic condition. In addition, it is considered that chromium hydroxide is also liberated and dissolved to cause the following reactions.

$$3Co^{3+} + 3e^- \rightarrow 3Co^{2+}$$

$$Cr^{3+} \rightarrow Cr^{6+} + 3e^-$$

Combination of these formulae gives the following.

$$Cr^{3+} + 3Co^{3+} \rightarrow Cr^{6+} + 3Co^{2+}$$

In short, it is considered that trivalent cobalt in the coating film oxidizes trivalent chromium to generate hexavalent chromium.

Meanwhile, it is considered that, even when $Co^{3+}$ is not contained or even when the coating film is formed from a chemical conversion treatment liquid having a strong oxidizing effect caused by a combination of chloric acid-nitric acid, or the like, hexavalent chromium is generated. Therefore, it is assumed that reduction of nitrate ion concentration in the treatment liquid is also helps to suppress the generation of hexavalent chromium. It is considered that, in a chemical conversion coating film containing a manganese compound such as manganese dioxide, and in a chemical conversion coating film containing, in the coating film, a large amount of ions of an element other than Co whose valence can vary, hexavalent chromium is generated by oxidation of trivalent chromium in a similar manner.

In addition, the present invention is achieved on the basis of the following discovery. Specifically, by adding a hexavalent chromium generation suppressing agent having an effect of suppressing hexavalent chromium generation to any one of a trivalent chromium chemical conversion treatment liquid, washing water for a trivalent chromium chemical conversion coating film and a finishing liquid therefor, hexavalent chromium which is otherwise generated in the trivalent chromium chemical conversion coating film can be suppressed, and an amount of hexavalent chromium eluted from the trivalent chromium chemical conversion coating film (an amount eluted when the coating film is immersed in a hot water at a temperature of 100° C. for 10 minutes) can be less than 0.05 μg/cm² even after the coating film is left.

Therefore, the present invention provides a chemical conversion treatment liquid for forming, on zinc or zinc alloy plating, a trivalent chromium chemical conversion coating film from which hexavalent chromium is substantially not eluted even after the coating film is left. The chemical conversion treatment liquid is characterized in that a content of trivalent chromium ions in the treatment liquid is 0.002 to 0.5 mol/l, a concentration of hexavalent chromium ions is 1 ppm or less, a content of cobalt ions is 0.1 mol/1 or less, a hexavalent chromium generation suppressing agent that can suppress generation of hexavalent chromium which is generated in the trivalent chromium chemical conversion coating film is contained in said liquid, and a pH of the chemical conversion treatment liquid is 0.5 to 5.

In addition, the present invention provides washing water or a finishing liquid for a trivalent chromium chemical conversion coating film formed on zinc or zinc alloy plating, for suppressing hexavalent chromium which is otherwise generated in the trivalent chromium chemical conversion coating film. The washing water or the finishing liquid is characterized by containing a hexavalent chromium generation suppressing agent that can suppress generation of hexavalent chromium which is generated in the trivalent chromium chemical conversion coating film at 0.1 to 10 g/l, and characterized in that a pH of the washing water or the finishing liquid is 2 to 10.

In addition, the present invention is achieved on the basis of the following discovery. Specifically, a trivalent chromate coating film is formed by use of a trivalent chromium chemical conversion treatment liquid in which a content of cobalt ions is 250 ppm or less and a content of a sulfur compound is in the range of 100 to 1000 ppm in terms of sulfur atoms. As a result, hexavalent chromium which is otherwise generated in the trivalent chromium chemical conversion coating film can be suppressed, and an amount of hexavalent chromium eluted from the trivalent chromium chemical conversion coating film can be less than 0.05 μg/cm² even after the coating film is left (an amount eluted when the coating film is immersed in hot water at a temperature of 100° C. for 10 minutes).

Therefore, the present invention provides a chemical conversion treatment liquid for forming a trivalent chromate coating film from which hexavalent chromium is not substantially eluted after the coating film is left, the trivalent chromate coating film being formed on zinc or zinc alloy plating. The chemical conversion treatment liquid is characterized in that a content of trivalent chromium ions in the treatment liquid is 0.002 to 0.5 mol/l, a concentration of hexavalent chromium ions is 1 ppm or less, a content of cobalt ions is 250 ppm or less, and a sulfur compound is contained in the range of 100 to 1500 ppm in terms of sulfur atoms.

The trivalent chromium chemical conversion coating film according to the present invention further has an excellent corrosion resistance of the trivalent chromium chemical conversion coating film, in addition to a corrosion resistance of zinc plating itself. In addition, the coating film obtained by forming the trivalent chromium chemical conversion coating film directly on zinc plating undergoes no substantial elution of hexavalent chromium after the coating film is left, has a corrosion resistance and a salt water resistance equal to or higher than those of conventional hexavalent chromate, and can be applied in various colors. In addition, in the chemical conversion treatment liquid according to the present invention that can form such a chemical conversion coating film, the trivalent chromium concentration in the treatment liquid is low, and an organic acid concentration or nitrogen concentration can also further be reduced. Therefore, the treatment liquid is advantageous in wastewater treatment and thus has excellent cost performance.

BEST MODE FOR CARRYING OUT THE INVENTION

The substrate used in the present invention may be made of any of the following materials: various metals such as iron, nickel and copper; alloys thereof; and metals and alloys such as aluminum, which have been subjected to zincate conversion treatment, and may have any of various shapes such as plate-like, rectangular, column-like, cylindrical and spherical shapes.

The above substrate is plated with zinc or a zinc alloy by the usual method. The zinc plating may be deposited on the substrate using either of the following baths: an acidic/neutral bath such as a sulfuric acid bath, a borofluoride bath, a potassium chloride bath, a sodium chloride bath or an ammonium chloride-potassium chloride bath; or an alkaline bath such as a cyanide bath, a zincate bath or a pyrophoric acid bath, but particularly, a cyanide bath is preferable. The zinc alloy plating may be performed using either an ammonium chloride bath or an alkaline bath such as an organic chelate bath.

In addition, the zinc alloy plating may be zinc-iron alloy plating, zinc-nickel alloy plating, zinc-cobalt alloy plating or tin-zinc alloy plating. Zinc-iron alloy plating is preferable. The zinc or zinc alloy plating may be deposited on a substrate in any thickness, but preferably in a thickness of 1 μm or more, and more preferably in a thickness of 5 to 25 μm.

In the present invention, after the zinc or zinc alloy plating is deposited on a substrate according to the above method, the plated substrate is appropriately pretreated by, for example, being washed with water and optionally activated by a nitric acid, as needed. Thereafter, the zinc or zinc alloy plating is subjected to chemical conversion treatment by a dipping treatment, or the like using a chemical conversion treatment liquid for forming the trivalent chromium chemical conversion coating film according to the present invention.

The chemical conversion treatment liquid of the first aspect of the present invention contains trivalent chromium ions, cobalt ions and hexavalent chromium generation suppressing agent that can suppress generation of hexavalent chromium which is otherwise generated in the trivalent chromium chemical conversion coating film.

In the chemical conversion treatment liquid, any chromium compound containing trivalent chromium ions may be used as a source of trivalent chromium ions. For example, the sources of trivalent chromium salts such as chromium chloride, chromium sulfate, chromium nitrate, chromium phosphate or chromium acetate can be used, or, alternatively, trivalent chromium ions can be obtained by the reduction of hexavalent chromium ions of chromic acid, a dichromate, or the like with a reducing agent. However, the sources are not limited to these examples. One of the above sources of trivalent chromium ions or any combination of at least two of them may be used. A content of trivalent chromium ions in the chemical conversion treatment liquid should preferably be 0.002 to 0.5 mol/l, and should more preferably be 0.02 to 0.1 mol/l. Meanwhile, a concentration of hexavalent chromium ions in the chemical conversion treatment liquid should preferably be 1 ppm or less, and should more preferably be 0.5 ppm or less.

In the chemical conversion treatment liquid, any metal compound containing cobalt may be used as a source of cobalt ions. Examples of such metal compounds include cobalt nitrate, cobalt sulfate, cobalt chloride, cobalt carbonate and cobalt hydroxide. However, the metal compounds are not limited to these examples. One of the above metal compounds or any combination of at least two of them may be used. A content of cobalt ions in the chemical conversion treatment liquid should preferably be 0.1 mol/l or less, should more preferably be 0.001 to 0.06 mol/l, and should still more preferably be 0.005 to 0.04 mol/l.

In the chemical conversion treatment liquid, any additives can be used as the hexavalent chromium generation suppressing agent as long as the additives can suppress generation of hexavalent chromium which is otherwise generated in the trivalent chromium chemical conversion coating film. In order to find out additives that can suppress generation of hexavalent chromium, various additives are added to chemical conversion treatment liquids for forming the trivalent chromate coating film and effect of the additives is examined by experiments. As a result, organic reducing compounds such as ascorbate ions, citrate ions, tannate ions, gallate ions, tartrate ions, hydroxy(iso)quinolines, phenols and thiourea, and inorganic or metal reducing compounds such as phosphate ions, chromium phosphate ions, vanadium ions and titanium ions show the effect. Therefore, preferable hexavalent chromium generation suppressing agents include ascorbic acid, salts thereof, citric acid, salts thereof, tannic acid, salts thereof, gallic acid, salts thereof, tartaric acid, salts thereof, thiourea, phosphoric acid, salts thereof, vanadium compounds, titanium compounds, and the like. A content of the hexavalent chromium generation suppressing agent in the chemical conversion treatment liquid should preferably be 0.1 to 5 g/l, should more preferably be 0.2 to 3 g/l, and should still more preferably be 0.3 to 2 g/l.

A pH of the chemical conversion treatment liquid should preferably be 0.5 to 5, and should more preferably be 2 to 3. The pH can be adjusted to this range by using the inorganic acid ions as described below, and also by using an alkaline agent such as an alkaline hydroxide, ammonia water, or the like.

The chemical conversion treatment liquid may contain one or more kinds selected from inorganic acids, alkaline salts thereof, and the like. Examples of inorganic acids include sulfuric acid, nitric acid, hydrochloric acid, and the like. However, the inorganic acids are not limited to these examples. When one or more kinds selected from inorganic acids, alkaline salts thereof, and the like are contained, a concentration thereof in the chemical conversion treatment liquid should preferably be 1 to 50 g/L, and should more preferably be 4 to 20 g/L.

In addition, the chemical conversion treatment liquid may contain one or more kinds of hydroxycarboxylic acids, monocarboxylic acids, polyvalent carboxylic acids, aminocarboxylic acids, alkaline salts thereof, and the like as chelating agents for trivalent chromium ions. Examples of hydroxycarboxylic acids include malic acid, and the like. However, the hydroxycarboxylic acids are not limited to these examples. Examples of monocarboxylic acids include formic acid, acetic acid, and the like. However, the monocarboxylic acids are not limited to these examples. Examples of polyvalent carboxylic acids include: dicarboxylic acids such as oxalic acid, malonic acid, succinic acid, adipic acid and diglycolic acid; tricarboxylic acids such as propanetricarboxylic acid, and the like. However, the polyvalent carboxylic acids are not limited to these examples. Examples of aminocarboxylic acids include glycine, aspartic acid, and the like. However, the aminocarboxylic acids are not limited to these examples. Among these, polyvalent carboxylic acids are preferable, and oxalic acid, malonic acid and succinic acid are more preferable. When the chelating agent for trivalent chromium ions is contained, a concentration thereof in the chemical conversion treatment liquid should preferably be in the range of 0.2 to 2 mole, should more preferably be in the range of 0.3 to 2 mole, should still more preferably be in the range of 0.5 to 2 mole, and should still further more preferably be in the range of 0.7 to 1.8 mole per mole of trivalent chromium ions.

In addition, the chemical conversion treatment liquid may contain one or more kinds of silicon compounds. Examples of silicon compounds include colloidal silica, sodium silicate, potassium silicate, lithium silicate, and the like. However, the silicon compounds are not limited to these examples. When the silicon compound is contained, a concentration thereof in the chemical conversion treatment liquid should preferably be 1 to 20 g/l, and should more preferably be 2 to 10 g/l in terms of Si. Colloidal silica is particularly preferable. A concentration thereof should preferably be 1 to 100 ml/l as a 20% SiO2 aqueous solution. By adding colloidal silica, a coating film with a bilayer structure of a Si—O layer and a Cr—O layer can be formed, whereby the corrosion resistance can be further improved. In addition, the chemical conversion treatment liquid may contain one or more kinds of agents for reducing a coating film overall friction coefficient. Examples of such agents for reducing a coating film overall friction coefficient include quinoline-based compounds such as quinoline sulfonic acid, quinaldic acid, quinophthalone and derivatives thereof described in Japanese Patent Application Publication No. 2005-248233. When the agent for reducing a coating film overall friction coefficient is contained, a concentration thereof in the chemical conversion treatment liquid should preferably be 0.1 to 25 g/l, and should more preferably be 0.2 to 15 g/l. The trivalent chromium chemical conversion coating film according to the present invention formed by treatment with the chemical conversion treatment liquid containing such a agent for reducing a coating film overall friction coefficient is a coating film that has a reduced coating film overall friction coefficient.

The rest of the chemical conversion treatment liquid other than the above essential components is water.

Usually, a nitrogen-containing compound, mainly nitrate ions, is used in large amount in a trivalent chromium chemical conversion treatment liquid, for improving the corrosion resistance of a trivalent chromium chemical conversion coating film. Consequently, the nitrogen atom concentration in the treatment liquid is high, for example 3 to 9 g/l, and there is a problem in terms of the wastewater treatment. In the chemical conversion treatment liquid according to the present invention, nitrate ions may be used in an amount similar to a conventional treatment liquid. However, even when nitrate ions are considerably decreased, and a nitrogen atom concentration, in the chemical conversion treatment liquid, mainly derived from nitrate ions is considerably reduced to 500 ppm/1 or less, the trivalent chromium chemical conversion coating film that has an excellent corrosion resistance and from which elution of hexavalent chromium is suppressed when the coating film is left can be obtained from the chemical conversion treatment liquid. In the above treatment liquid, a content is specifically 500 ppm or less in terms of nitrogen atoms, should preferably be in the range of 30 to 400 ppm and should more preferably be in the range of 50 to 300 ppm, for example. A metal reducing compound is preferable as the hexavalent chromium generation suppressing agent. Particularly, vanadium compounds, titanium compounds, magnesium compounds and combination thereof are preferable.

In addition, cobalt ions may be contained but are not necessarily contained. However, cobalt ions should be contained preferably in the range of 0.001 to 0.06 mol/l, and more preferably in the range of 0.005 to 0.04 mol/l, because corrosion resistance of the chemical conversion coating film under heating is further improved.

A method for forming a trivalent chromium chemical conversion coating film on zinc or zinc alloy plating by using the chemical conversion treatment liquid is commonly to immerse a zinc or zinc alloy plated substrate into the chemical conversion treatment liquid. A temperature of the chemical conversion treatment liquid at immersion is, for example, 10 to 70° C. The temperature should preferably be 30 to 50° C. An immersion time should preferably be 5 to 600 seconds, and should more preferably be 15 to 120 seconds. Meanwhile, immersion into a diluted nitric acid solution, a diluted sulfuric acid solution, a diluted hydrochloric acid solution, a diluted hydrofluoric acid solution, or the like may be performed before trivalent chromium chemical conversion treatment, for activating the surface of the zinc or zinc alloy plating. The conditions and treatment operations other than those described above may follow the conventional hexavalent chromate treatment method.

Meanwhile, the second aspect of the present invention is washing water or a finishing liquid for a trivalent chromium chemical conversion coating film formed on zinc or zinc alloy plating. The washing water or the finishing liquid is used for suppressing hexavalent chromium which is otherwise generated in the trivalent chromium chemical conversion coating film. The washing water or the finishing liquid contains a hexavalent chromium generation suppressing agent that can suppress generation of hexavalent chromium which is otherwise generated in the trivalent chromium chemical conversion coating film. A method for forming a trivalent chromium chemical conversion coating film to which the washing water or the finishing liquid is applied is not particularly limited, and may be any known method. The washing water or the finishing liquid is particularly effective in the following cases: the trivalent chromium chemical conversion coating film contains $Co^{2+}$ and $Co^{3+}$; the trivalent chromium chemical conversion coating film is a coating film formed from a chemical conversion treatment liquid having a stronger oxidizing effect caused by a combination of chloric acid-nitric acid, or the like; the trivalent chromium chemical conversion coating film contains a manganese compound such as manganese dioxide; and the trivalent chromium chemical conversion coating film contains, in the coating film, a large amount of ions of an element, other than Co, whose valence can vary. Meanwhile, the hexavalent chromium generation suppressing agent is already described above.

A content of the hexavalent chromium generation suppressing agent in the washing water or the finishing liquid should preferably be 0.1 to 10 g/l, should more preferably be 0.2 to 5 g/l, and should still more preferably be 0.3 to 3 g/l. Examples of preferable hexavalent chromium generation suppressing agents include ascorbic acid, salts thereof, citric acid, salts thereof, tannic acid, salts thereof, gallic acid, salts thereof, tartaric acid, salts thereof, thiourea, phosphoric acid, salts thereof, and the like.

A pH of the washing water or the finishing liquid should preferably be 2 to 10, and should more preferably be 3 to 6. The pH may be adjusted to this range by using the inorganic acid ions as described below, or by using an alkaline agent such as an alkaline hydroxide, ammonia water, or the like.

A method for treating a trivalent chromium chemical conversion coating film using the washing water or the finishing liquid is not particularly limited, and conventional and known methods such as immersing, applying, spraying, and the like may be used. However, to immerse a trivalent chromium chemical conversion coating film into the washing water or the finishing liquid is commonly employed. A temperature of the washing water or the finishing liquid at immersion is, for example, 10 to 70° C. The temperature should preferably be 20 to 50° C. An immersion time should preferably be 5 to 120 seconds, and should more preferably be 5 to 15 seconds.

Meanwhile, a chemical conversion treatment liquid of the third aspect of the present invention contains trivalent chromium ions, cobalt ions and a sulfur compound.

In the chemical conversion treatment liquid, any chromium compound containing trivalent chromium ions may be used as a source of trivalent chromium ions. For example, the source should be trivalent chromium salt such as chromium chloride, chromium sulfate, chromium nitrate, chromium phosphate or chromium acetate, or, alternatively, trivalent chromium ions can be obtained by the reduction of hexavalent chromium ions of chromic acid, a dichromate, or the like with a reducing agent. However, the source is not limited to these examples. One of the above sources of trivalent chromium ions or any combination of at least two of them may be used. A content of trivalent chromium ions in the chemical conversion treatment liquid should preferably be 0.002 to 0.5 mol/l, and should more preferably be 0.02 to 0.1 mol/l.

Meanwhile, a concentration of hexavalent chromium ions in the chemical conversion treatment liquid should preferably be 1 ppm or less, and should more preferably be 0.5 ppm or less.

A content of cobalt ions in the chemical conversion treatment liquid is 250 ppm or less. The chemical conversion treatment liquid does not necessarily contain cobalt ions. Since the sulfur compound is contained, the formed trivalent chromium chemical conversion coating film has a sufficient corrosion resistance even when cobalt ions are not contained. A content of cobalt ions in the chemical conversion treatment liquid should preferably be 100 to 250 ppm, and should more preferably be 150 to 200 ppm, when a higher corrosion resistance is required. When the chemical conversion treatment liquid contains cobalt ions, any metal compound containing cobalt can be used as a source of cobalt ions. Examples of such metal compounds include cobalt nitrate, cobalt sulfate, cobalt chloride, cobalt carbonate and cobalt hydroxide. However, the metal compounds are not limited to these examples. One of the above metal compounds or any combination of at least two of them may be used.

In the chemical conversion treatment liquid, an organic sulfur compound is preferable as the sulfur compound. Specific examples of organic sulfur compounds include thiourea, thioglycerin, thioacetic acid, potassium thioacetate, thiodiacetic acid, 3,3-thiodipropionic acid, thiosemicarbazide, thioglycolic acid, thiodiglycolic acid, thiomaleic acid, thioacetamide, dithioglycolic acid, dithiodiglycolic acid, alkaline salts thereof, and the like. In addition, one of the above sulfur compounds or a mixture of two or more of them can be used. A content of the sulfur compound in the chemical conversion treatment liquid should preferably be 100 to 1500 ppm, should more preferably be 300 to 1000 ppm, and should still more preferably be 400 to 800 ppm in terms of sulfur atoms. By adding the sulfur compound, the formed trivalent chromium chemical conversion coating film has a sufficient corrosion resistance, even when a concentration of cobalt ions in the coating film is 0.2 μg/cm$^2$ or less, and preferably 0.17 μg/cm$^2$ or less. In addition, in the trivalent chromium chemical conversion coating film formed from the chemical conversion treatment liquid, hexavalent chromium which is otherwise generated in the trivalent chromium chemical conversion coating film can be suppressed because of low concentration of cobalt ions in the coating film.

In the chemical conversion treatment liquid, a high corrosion resistance can be maintained even when nitrogen content in the treatment liquid is considerably reduced. A preferable nitrogen content is 500 ppm or less, and preferably 200 ppm or less in terms of nitrogen atoms. The content should more preferably be 40 to 200 ppm, and should still more preferably be 60 to 130 ppm.

In addition, the chemical conversion treatment liquid may contain one or more kinds of silicon compounds. Examples of silicon compounds include colloidal silica, sodium silicate, potassium silicate, lithium silicate, and the like. However, the silicon compounds are not limited to these examples. When the silicon compound is contained, a concentration thereof in the chemical conversion treatment liquid should preferably be 1 to 20 g/l, and should more preferably be 2 to 10 g/l in terms of Si. Colloidal silica is particularly preferable. A concentration thereof should preferably be 1 to 100 ml/l as a 20% $SiO_2$ aqueous solution. By adding colloidal silica, a coating film with a bilayer structure of a Si—O layer and a Cr—O layer can be formed, whereby corrosion resistance can be further improved.

In addition, the chemical conversion treatment liquid may contain one or more kinds of agents for reducing a coating film overall friction coefficient. Examples of such agents for reducing a coating film overall friction coefficient include quinoline-based compounds such as quinoline sulfonic acid, quinaldic acid, quinophthalone and derivatives thereof described in Japanese Patent Application Publication No. 2005-248233. When the agent for reducing a coating film overall friction coefficient is contained, a concentration thereof in the chemical conversion treatment liquid should preferably be 0.1 to 25 g/l, and should more preferably be 0.2 to 15 g/l. The trivalent chromium chemical conversion coating film according to the present invention formed by treatment with the chemical conversion treatment liquid containing such a agent for reducing a coating film overall friction coefficient is a coating film that has a reduced coating film overall friction coefficient.

In addition, the chemical conversion treatment liquid may contain one or more kinds selected from inorganic acids, alkaline salts thereof, and the like. Examples of inorganic acids include sulfuric acid, nitric acid, hydrochloric acid, and the like. However, the inorganic acids are not limited to these examples. When one or more kinds selected from inorganic acids, the alkaline salts thereof, and the like are contained, a concentration thereof in the chemical conversion treatment liquid should preferably be 0.01 to 50 g/L, and should more preferably be 0.05 to 20 g/L.

In addition, the chemical conversion treatment liquid may contain one or more kinds selected from phosphorus oxoacids such as hypophosphorous acid, phosphoric acid, alkaline salts thereof, and the like. When one or more kinds selected from phosphorus oxoacids such as hypophosphorous acid, phosphoric acid, alkaline salts thereof, and the like are contained, the concentration thereof in the chemical conversion treatment liquid should preferably be 0.1 to 50 g/L, and should more preferably be 4 to 25 g/L.

Furthermore, the chemical conversion treatment liquid may contain one or more kinds of hydroxycarboxylic acids, monocarboxylic acids, polyvalent carboxylic acids, aminocarboxylic acids, alkaline salts thereof, and the like as chelating agents for trivalent chromium ions. Examples of hydroxycarboxylic acids include malic acid, and the like. However, the hydroxycarboxylic acids are not limited to these examples. Examples of monocarboxylic acids include formic acid, acetic acid, and the like. However, the monocarboxylic acids are not limited to these examples. Examples of polyvalent carboxylic acids include: dicarboxylic acids such as oxalic acid, malonic acid, succinic acid, adipic acid and diglycolic acid; tricarboxylic acids such as propanetricarboxylic acid, and the like. However, the polyvalent carboxylic acids are not limited to these examples. Examples of aminocarboxylic acids include glycine, aspartic acid, and the like. However, the aminocarboxylic acids are not limited to these examples. Among these, polyvalent carboxylic acids are preferable, and oxalic acid, malonic acid and succinic acid are more preferable. When the above carboxylic acids and alkaline salts thereof are contained, a concentration thereof in the chemical conversion treatment liquid should preferably be in the range of 0.2 to 2 mole, should more preferably be in the range of 0.3 to 2 mole, should still more preferably be in the range of 0.5 to 2 mole, and should still further more preferably be in the range of 0.7 to 1.8 mole per mole of trivalent chromium ions.

In addition, the chemical conversion treatment liquid may contain one or more kinds of ions of metal selected from Mg, Al, Mn, Ti, W, V, Mo, Ni, Fe, Zn, Zr, Ca, Nb, Ta, Sn and Ce. When the metal ions are contained, a concentration thereof in the chemical conversion treatment liquid should preferably be 1 to 10 g/l, and should more preferably be 2 to 8 g/l.

A pH of the chemical conversion treatment liquid should preferably be 0.5 to 5, and should more preferably be 2 to 3. The pH may be adjusted to this range by using the inorganic acid ions as described below, or by using an alkaline agent such as an alkaline hydroxide, ammonia water, or the like.

The rest of the chemical conversion treatment liquid other than the above essential components is water.

A method for forming a trivalent chromium chemical conversion coating film on zinc or zinc alloy plating by using the chemical conversion treatment liquid is commonly to immerse a zinc or zinc alloy plated substrate into the chemical conversion treatment liquid. A temperature of the chemical conversion treatment liquid at immersion is, for example, 10 to 70° C. The temperature should preferably be 25 to 35° C. An immersion time should preferably be 5 to 600 seconds, and should more preferably be 15 to 120 seconds. Meanwhile, immersion into a diluted nitric acid solution, a diluted sulfuric acid solution, a diluted hydrochloric acid solution, a diluted hydrofluoric acid solution, or the like may be performed before trivalent chromium chemical conversion treatment, for activating the surface of the zinc or zinc alloy plating. The conditions and treatment operations other than those described above may follow the conventional hexavalent chromate treatment method.

Overcoating the trivalent chromium chemical conversion coating film formed by using the chemical conversion treatment liquid according to the present invention can improve the corrosion resistance thereof, and thus is a highly effective means for achieving longer-lasting corrosion resistance. For example, the trivalent chromium chemical conversion coating film is firstly formed on the zinc or zinc alloy plating using the chemical conversion treatment liquid according to the present invention, then washed with water, then immersed into an overcoating solution or subjected to an electrolytic treatment therein, and thereafter dried. Alternatively, the trivalent chromium chemical conversion coating film may be dried after formation thereof, and thereafter further immersed into an overcoating solution or subjected to an electrolytic treatment therein, and then dried. Here, as the overcoating, as well as an inorganic coating film made of silicates, phosphates, or the like, an organic coating film made of polyethylene, polyvinyl chloride, polystyrene, polypropylene, methacrylate resin, polycarbonate, polyamide, polyacetal, fluorine resin, urea resin, phenolic resin, unsaturated polyester resin, polyurethane, alkyd resin, epoxy resin, melamine resin, or the like may be effectively used.

As the overcoating solution for overcoating such a film, DIPCOAT W or CC445 available from Dipsol Chemicals Co., Ltd. or the like may be used. The thickness of the overcoating may be any value, but should preferably be 0.1 to 30 μm.

Next, the present invention is described by referring to Examples and Comparative Examples.

EXAMPLES

Examples 1 to 8

An M6 bolt (material: iron), which had been plated with zinc using a zincate (NZ-200 available from Dipsol Chemicals Co., Ltd.) in Examples 1 to 2 and 6 to 8 or acidic zinc (EZ-960 available from. Dipsol Chemicals Co., Ltd.) in Examples 3 to 5 in a thickness of 8 μm, was immersed in a chemical conversion treatment liquid shown in Table 1 under conditions shown in Table 1. In addition, in Examples 6 to 8, the immersed bolt was immersed in a finishing liquid shown in Table 1 under conditions shown in Table 1. After immersion, the coating film was dried under conditions at 80° C. for 10 minutes.

TABLE 1

| | Example | | | | | | | |
|---|---|---|---|---|---|---|---|---|
| | 1 | 2 | 3 | 4 | 5 | 6 | 7 | 8 |
| Composition of trivalent chromium chemical conversion treatment liquid | | | | | | | | |
| $Cr^{3+}$ (mol/l) | 0.077 | 0.077 | 0.077 | 0.077 | 0.077 | 0.077 | 0.077 | 0.077 |
| $Cr^{6+}$ | 0 | 0 | 0 | 0 | 0 | 0 | 0 | 0 |

TABLE 1-continued

| | Example | | | | | | | |
|---|---|---|---|---|---|---|---|---|
| | 1 | 2 | 3 | 4 | 5 | 6 | 7 | 8 |
| Oxalic acid (g/l) | 12 | 12 | 12 | 12 | 12 | 12 | 12 | 12 |
| (mol/mol of $Cr^{3+}$) | (1.7) | (1.7) | (1.7) | (1.7) | (1.7) | (1.7) | (1.7) | (1.7) |
| $Co^{2+}$ (mol/l) | 0.034 | 0.034 | 0.034 | 0.034 | 0.034 | 0.034 | 0.034 | 0.034 |
| hexavalent chromium generation suppressing agent (0.5 g/l) | Tannic acid | Gallic acid | Thiourea | Vanadium ion (vanadium chloride) | phosphate ion (sodium dihydrogen phosphate) | — | — | — |
| Nitrogen content in terms of nitrogen atoms (g/l) | 4.2 | 4.2 | 4.2 | 4.2 | 4.2 | 4.2 | 4.2 | 4.2 |
| pH | 2.3 | 2.3 | 2.3 | 2.3 | 2.3 | 2.3 | 2.3 | 2.3 |
| Treatment temperature (° C.) | 30 | 30 | 30 | 30 | 30 | 30 | 30 | 30 |
| Treatment time (seconds) | 40 | 40 | 40 | 40 | 40 | 40 | 40 | 40 |
| Composition of finishing liquid | | | | | | | | |
| Ascorbic acid (g/l) | | | | | | 2 | | |
| Tannic acid (g/l) | | | | | | | | 1 |
| Chromium phosphate (g/l) + citric acid (g/l) | | | | | | | 2 + 3 | |
| pH of finishing liquid | | | | | | 4 | 4 | 6 |
| Finishing treatment temperature (° C.) | | | | | | 25 | 40 | 25 |
| Finishing treatment time (seconds) | | | | | | 15 | 5 | 15 |

A 40% chromium nitrate aqueous solution was employed as a source of $Cr^{3+}$, and cobalt nitrate was employed as a source of $Co^{2+}$. The rest of the solution was water.

Comparative Example 1

An M6 bolt (material: iron), which had been plated with zinc using a zincate (NZ-200 available from Dipsol Chemicals Co., Ltd.) in a thickness of 8 μm, was subjected to a hexavalent chromate treatment. As the hexavalent chromate treatment liquid, Z-493 (10 ml/l) available from Dipsol Chemicals Co., Ltd. was used, and the bolt was immersed at 25° C. for 20 seconds. After immersion, the coating film was dried under conditions at 60° C. for 10 minutes.

Comparative Example 2

A trivalent chromium chemical conversion coating film was formed on an M6 bolt (material: iron), which had been plated with zinc using a zincate (NZ-200 available from Dipsol Chemicals Co., Ltd.) in a thickness of 8 um. As the chemical conversion treatment liquid, a chemical conversion treatment liquid having the following composition was used, and the bolt was immersed at 30° C. for 40 seconds. After immersion, the coating film was dried under conditions at 80° C. for 10 minutes.

| | |
|---|---|
| $Cr^{3+}$ | 4 g/l (40% chromium nitrate was used. 0.077 mol/l in terms of Cr) |
| Oxalic acid | 12 g/l |
| $Co(NO_3)_2$ | 10 g/l (0.034 mol/l in terms of Co) |
| pH | 2.3 |

Table 2 shows concentrations of $Cr^{3+}$, concentrations of $Cr^{6+}$ and concentrations of $Co^{2+}$ in the chemical conversion coating films obtained in Examples 1 to 8 and Comparative Examples 1 and 2, appearances, results of salt spray test (JIS Z-2371) and amounts of hexavalent chromium eluted after the storage test. As shown in Table 3, the coating films of Examples 1 to 8 exhibited corrosion resistance equal to or better than that of the conventional hexavalent chromate chemical conversion coating film of Comparative Example 1. In addition, the amounts of hexavalent chromium eluted after storage test were less than the measurement limit value.

TABLE 2

| | Concentration in coating film (μg/cm²) | | | Appearance of coating film | Corrosion resistance Time required for the formation of white rust (Hrs) | Amount of $Cr^{6+}$ eluted after shelf test (μg/cm²) |
|---|---|---|---|---|---|---|
| | $Cr^{3+}$ | $Cr^{6+}$ | $Co^{2+}$ | | | |
| Example 1 | 8.5 | 0 | 0.7 | Pale reddish green | 300 | <0.05 |
| Example 2 | 10.5 | 0 | 2.5 | Pale reddish green | 300 | <0.05 |
| Example 3 | 6.7 | 0 | 1.6 | Pale reddish green | 300 | <0.05 |
| Example 4 | 7.0 | 0 | 0.6 | Pale reddish green | 300 | <0.05 |
| Example 5 | 5.4 | 0 | 0.4 | Pale reddish green | 300 | <0.05 |
| Example 6 | 10.0 | 0 | 2.3 | Pale reddish green | 300 | <0.05 |
| Example 7 | 10.8 | 0 | 1.0 | Pale reddish green | 300 | <0.05 |
| Example 8 | 10.7 | 0 | 2.9 | Pale reddish green | 300 | <0.05 |
| Comparative Example 1 | 20 | 6.8 | 0 | Reddish green | 240 | 6.8 |

TABLE 2-continued

| | Concentration in coating film (μg/cm²) | | | Appearance of coating film | Corrosion resistance Time required for the formation of white rust (Hrs) | Amount of $Cr^{6+}$ eluted after shelf test (μg/cm²) |
|---|---|---|---|---|---|---|
| | $Cr^{3+}$ | $Cr^{6+}$ | $Co^{2+}$ | | | |
| Comparative Example 2 | 11 | 0.01 | 2.8 | Pale reddish green | 240 | 0.12 |

Examples 9 to 11

An M6 Bolt (material: iron), which had been plated with zinc using a zincate (NZ-200 available from Dipsol Chemicals Co., Ltd.) in a thickness of 8 μm, were immersed into a chemical conversion treatment liquid shown in Table 3 under conditions shown in Table 3. After immersion, the coating film was dried under conditions at 80° C. for 10 minutes.

TABLE 3

| | Example | | |
|---|---|---|---|
| | 9 | 10 | 11 |
| $Cr^{3+}$ (mol/l) | 0.038 | 0.038 | 0.038 |
| $Cr^{6+}$ (ppm) | 0 | 0 | 0 |
| Nitrogen content in terms of nitrogen atoms (ppm) | 90 | 90 | 90 |
| $SO_4^{2-}$ (g/L) | 0 | 6.0 | 6.0 |
| $Cl^-$ (g/L) | 4.4 | 0 | 0 |
| Thiodiglycolic acid (g/L) (in terms of sulfur content (ppm)) | 2 (430) | 2 (430) | 0 |
| Thiourea (g/L) (in terms of sulfur content (ppm)) | 0 | 0 | 2 (840) |
| $Co^{2+}$ (ppm) | 200 | 200 | 200 |
| Si (g/L) | 2 | 2 | 2 |
| ph of treatment liquid | 2.4 | 2.4 | 2.4 |
| Treatment temperature (° C.) | 30 | 30 | 30 |
| Treatment time (seconds) | 60 | 40 | 40 |

A 35% chromium chloride aqueous solution (Example 9) or a 35% chromium sulfate aqueous solution (Examples 10 and 11) was employed as a source of $Cr^{3+}$. Cobalt chloride (Example 9) or cobalt sulfate (Examples 10 and 11) was employed as a source of $Co^{2+}$. Si was an acidic colloidal silica (SNOWTEX-O available from Nissan Chemical Industries, Ltd.). The rest of the solution was water.

Examples 12 to 14

Overcoating was performed on the trivalent chromium chemical conversion coating film of Example 9. Table 4 shows the overcoating conditions.

TABLE 4

| | Example | | |
|---|---|---|---|
| | 12 | 13 | 14 |
| Type of overcoating | Chromium phosphate-based inorganic coating film | Inorganic silicate-based inorganic coating film | Methacrylate resin-based Si-dispersed-type organic coating film |
| Treatment concentration | 150 ml/l | 200 ml/l | Undiluted liquid was used |
| Treatment conditions | 45° C., 10 seconds | 25° C., 30 seconds | 25° C., 30 seconds |
| Name of agent | ZTB-118 available from Dipsol Chemicals Co., Ltd. | CC-445Y available from Dipsol Chemicals Co., Ltd. | DIPCOAT W available from Dipsol Chemicals Co., Ltd. |

Table 5 shows concentrations of $Cr^{3+}$, concentrations of $Cr^{6+}$ and concentrations of $Co^{2+}$ in the chemical conversion coating films obtained in Examples 9 to 14 and Comparative Examples 1 and 2, appearances, results of salt spray test (JIS Z-2371) and amounts of hexavalent chromium eluted after storage test. As shown in Table 5, the coating films of Examples 9 to 14 exhibited corrosion resistance equal to or better than that of the conventional hexavalent chromate chemical conversion coating film of Comparative Example 1. In addition, the overcoated coating films (Examples 12 to 14) exhibited better corrosion resistance than the conventional hexavalent chromate chemical conversion coating film. In addition, the amounts of hexavalent chromium eluted after storage test were less than the measurement limit value.

TABLE 5

| | Concentration in coating film (μg/cm²) | | | Appearance of coating film | Corrosion resistance Time required for the formation of white rust (Hrs) | Amount of $Cr^{6+}$ eluted after shelf test (μg/cm²) |
|---|---|---|---|---|---|---|
| | $Cr^{3+}$ | $Cr^{6+}$ | $Co^{2+}$ | | | |
| Example 9 | 7.0 | 0 | 0.1 | Light blue | 240 | <0.05 |
| Example 10 | 5.8 | 0 | 0.1 | Light blue | 240 | <0.05 |

TABLE 5-continued

| | Concentration in coating film (μg/cm²) | | | Appearance of coating film | Corrosion resistance Time required for the formation of white rust (Hrs) | Amount of Cr⁶⁺ eluted after shelf test (μg/cm²) |
|---|---|---|---|---|---|---|
| | Cr³⁺ | Cr⁶⁺ | Co²⁺ | | | |
| Example 11 | 6.0 | 0 | 0.1 | Light blue | 240 | <0.05 |
| Example 12 | 7.0 | 0 | 0.1 | light interference color | 1000 or more | <0.05 |
| Example 13 | 7.0 | 0 | 0.1 | colorless | 1000 or more | <0.05 |
| Example 14 | 7.0 | 0 | 0.1 | colorless | 1000 or more | <0.05 |
| Comparative Example 1 | 20 | 6.8 | 0 | Reddish green | 240 | 6.8 |
| Comparative Example 2 | 11 | 0.11 | 2.8 | Pale reddish green | 240 | 0.12 |

(Measurement of $Cr^{6+}$ Concentration in Coating Film)

A coating film sample (50 cm²) was immersed into approximately 50 ml of hot water at a temperature of 100° C. for 10 minutes. An amount of hexavalent chromium eluted from the coating film sample was determined by the absorption spectroscopy using diphenylcarbazide (in accordance with EN-15205).

(Measurement of $Cr^{3+}$ Concentration and $Co^{2+}$ Concentration in Coating Film)

After measuring the $Cr^{6+}$ concentration, the same sample was dissolved into hydrochloric acid, and $Cr^{3+}$ and $Co^{2+}$ concentrations in the solution was measured by ICP optical emission spectrometry.

(Salt Spray Test)

In a salt spray test, evaluation was made in accordance with JIS-Z-2371.

(Procedure of Storage Test and Measurement of Amount of Hexavalent Chromium Eluted after the Storage Test)

A storage test was performed as an acceleration test by employing a method in which a sample for the elution test was left for 30 days in a constant temperature and humidity chamber maintained at a temperature of 80° C. and a humidity of 95%. Then, the sample after the storage test was immersed into hot water at a temperature of 100° C. for 10 minutes by a method similar to the above-described measuring method of $Cr^{6+}$ concentration in a coating film. An amount of hexavalent chromium eluted from the coating film sample was determined by absorption spectroscopy using diphenylcarbazide (in accordance with EN-15205).

Examples 15 to 20

An M6 Bolt (material: iron), which had been plated with zinc using a zincate (NZ-200 available from Dipsol Chemicals Co., Ltd.) in a thickness of 8 μm, was immersed into a chemical conversion treatment liquid shown in Table 6 under conditions shown in Table 6. After immersion, the coating film was dried under conditions at 80° C. for 10 minutes.

TABLE 6

| | Example | | | | | |
|---|---|---|---|---|---|---|
| | 15 | 16 | 17 | 18 | 19 | 20 |
| Cr³⁺ (mol/l) | 0.038 | 0.038 | 0.038 | 0.038 | 0.038 | 0.038 |
| Cr⁶⁺ (ppm) | 0 | 0 | 0 | 0 | 0 | 0 |
| Nitrogen content in terms of nitrogen atoms (ppm) | 135 | 270 | 270 | 90 | 90 | 90 |
| Tartaric acid(g/l) (mol/mol of Cr³⁺) | 0 | 0 | 0 | 2 (0.35) | 2 (0.35) | 0 |
| Malic acid(g/l) (mol/mol of Cr³⁺) | 5 (0.97) | 5 (0.97) | 0 | 0 | 0 | 5 (0.97) |
| SO₄²⁻ (g/l) | 0 | 0 | 2 | 2 | 0 | 0 |
| Cl⁻ (g/l) | 4 | 4 | 4 | 4 | 4 | 4 |
| Co²⁺ (mol/l) | 0.015 | 0.008 | 0 | 0.008 | 0.008 | 0.008 |
| VOSO₄ (g/l) | 1 | 1 | 0 | 0 | 1 | 0 |
| Ti(SO₄)₂ | 0 | 0 | 1 | 0 | 0 | 1 |
| MgSO₄ (g/l) | 0 | 0 | 0 | 2 | 0 | 0 |
| Si (g/l) | 5 | 2 | 5 | 10 | 5 | 10 |
| ph of treatment liquid | 2.0 | 2.1 | 2.0 | 2.3 | 2.4 | 2.5 |
| Treatment temperature (° C.) | 40 | 40 | 30 | 30 | 30 | 30 |
| Treatment time (seconds) | 20 | 30 | 60 | 40 | 40 | 60 |

A 35% chromium chloride aqueous solution was employed as a source of $Cr^{3+}$. Cobalt chloride was employed as a source of $Co^{2+}$. Si was an acidic colloidal silica (SNOWTEX-O available from Nissan Chemical Industries, Ltd.). The rest of the solution was water. Note that, the nitrogen content was derived from $NO_3^-$.

TABLE 7

| | Concentration in coating film (μg/cm²) | | | Appearance of coating film | Corrosion resistance Time required for the formation of white rust (Hrs) | Amount of $Cr^{6+}$ eluted after shelf test (μg/cm²) |
|---|---|---|---|---|---|---|
| | $Cr^{3+}$ | $Cr^{6+}$ | $Co^{2+}$ | | | |
| Example 15 | 7.2 | 0 | 0.15 | Light blue | 240 | <0.05 |
| Example 16 | 7.0 | 0 | 0.1 | Light blue | 240 | <0.05 |
| Example 17 | 6.2 | 0 | 0 | Light blue | 168 | <0.05 |
| Example 18 | 5.0 | 0 | 0.15 | Light blue | 144 | <0.05 |
| Example 19 | 4.3 | 0 | 0.1 | Light blue | 144 | <0.05 |
| Example 20 | 4.0 | 0 | 0.1 | Light blue | 144 | <0.05 |

The invention claimed is:

1. A method for reducing an amount of hexavalent chromium eluted from a trivalent chromium chemical conversion coating film left for 30 days in a constant temperature and humidity chamber at a temperature of 80° C. and at a humidity of 95% (an amount eluted by immersion of the coating film into hot water at a temperature of 100° C. for 10 minutes) to less than 0.05 μg/cm², the method comprising the steps of:
preparing chemical conversion treatment liquid for forming a trivalent chromium chemical conversion coating film, and
immersing a zinc or zinc alloy plated substrate into the chemical conversion treatment liquid, wherein
a content of trivalent chromium ions in the chemical conversion treatment liquid is 0.002 to 0.5 mol/l,
a concentration of hexavalent chromium ions in the chemical conversion treatment liquid is 1 ppm or less,
a content of cobalt ions in the chemical conversion treatment liquid is 0.1 mol/l or less,
the chemical conversion treatment liquid further contains a hexavalent chromium generation suppressing agent for suppressing generation of hexavalent chromium which is generated in the trivalent chromium chemical conversion coating film, wherein the hexavalent chromium generation suppressing agent is selected from the group consisting of ascorbic acid and salts thereof, tannic acid and salts thereof, and gallic acid and salts thereof,
a content of the hexavalent chromium generation suppressing agent in the chemical conversion treatment liquid is 0.1 to 5 g/l,
a pH of the chemical conversion treatment liquid is 0.5 to 5, and
a concentration of hexavalent chromium in terms of metal atoms in a chemical conversion coating film formed by using the same chemical conversion treatment liquid as the above chemical conversion treatment liquid excluding the hexavalent chromium generation suppressing agent is less than 0.01 μg/cm².

2. The method according to claim 1, wherein a concentration of trivalent chromium in terms of metal atoms in the trivalent chromium chemical conversion coating film is 2 to 20 μg/cm².

3. The method according to claim 1, wherein a concentration of cobalt in the trivalent chromium chemical conversion coating film is 0.2 to 3.5 μg/cm².

4. The method according to claim 1, wherein a concentration of cobalt in the trivalent chromium chemical conversion coating film is less than 0.2 μg/cm².

5. The method according to claim 1, wherein the hexavalent chromium generation suppressing agent is a reducing compound.

6. The method according to claim 1, wherein the chemical conversion treatment liquid further comprises a chelating agent in the range of 0.2 to 2 mole per mole of $Cr^{3+}$.

7. The method according to claim 1, wherein a content of nitrogen in the chemical conversion treatment liquid is 500 ppm or less in terms of nitrogen atoms.

8. The method according to claim 1, wherein the chemical conversion treatment liquid further comprises a quinoline-based compound or a derivative thereof.

9. A chemical conversion treatment liquid for forming a trivalent chromium chemical conversion coating film on zinc or zinc alloy plating, wherein
a content of trivalent chromium ions in the chemical conversion treatment liquid is 0.002 to 0.5 mol/l,
a concentration of hexavalent chromium ions in the chemical conversion treatment liquid is 1 ppm or less,
a content of cobalt ions in the chemical conversion treatment liquid is 0.1 mol/l or less,
the chemical conversion treatment liquid further contains a hexavalent chromium generation suppressing agent for suppressing generation of hexavalent chromium which is generated in the trivalent chromium chemical conversion coating film, wherein the hexavalent chromium generation suppressing agent is selected from the group consisting of ascorbic acid and salts thereof, tannic acid and salts thereof, and gallic acid and salts thereof,
a content of the hexavalent chromium generation suppressing agent in the chemical conversion treatment liquid is 0.1 to 5 g/l,
a pH of the chemical conversion treatment liquid is 0.5 to 5, and
a concentration of hexavalent chromium in terms of metal atoms in a chemical conversion coating film formed by using the same chemical conversion treatment liquid as the above chemical conversion treatment liquid excluding the hexavalent chromium generation suppressing agent is less than 0.01 μg/cm².

10. The chemical conversion treatment liquid according to claim 9, wherein the hexavalent chromium generation suppressing agent is a reducing compound.

11. The chemical conversion treatment liquid according to claim 9, further comprising a chelating agent in the range of 0.2 to 2 mole per mole of $Cr^{3+}$.

12. The chemical conversion treatment liquid according to claim 9, wherein a content of nitrogen in the chemical conversion treatment liquid is 500 ppm or less in terms of nitrogen atoms.

13. The chemical conversion treatment liquid according to claim 9, further comprising a quinoline-based compound or a derivative thereof.

\* \* \* \* \*